(12) United States Patent  
Tadano

(10) Patent No.: US 8,315,077 B2  
(45) Date of Patent: Nov. 20, 2012

(54) MATRIX CONVERTER SPACE VECTOR MODULATION METHOD

(75) Inventor: Yugo Tadano, Tokyo (JP)

(73) Assignee: Meidensha Corporation, Tokyo (JP)

( * ) Notice: Subject to any disclaimer, the term of this patent is extended or adjusted under 35 U.S.C. 154(b) by 547 days.

(21) Appl. No.: 12/528,395

(22) PCT Filed: Mar. 12, 2008

(86) PCT No.: PCT/JP2008/054479  
§ 371 (c)(1),  
(2), (4) Date: Aug. 24, 2009

(87) PCT Pub. No.: WO2008/126591  
PCT Pub. Date: Oct. 23, 2008

(65) Prior Publication Data  
US 2010/0091534 A1    Apr. 15, 2010

(30) Foreign Application Priority Data  
Mar. 14, 2007   (JP) .................................. 2007-065864

(51) Int. Cl.  
*H02M 5/00*    (2006.01)

(52) U.S. Cl. ....................................................... 363/157

(58) Field of Classification Search ........... 363/157–165  
See application file for complete search history.

(56) References Cited

U.S. PATENT DOCUMENTS  
5,949,672  A  *  9/1999  Bernet ........................... 363/159  
6,118,932  A  *  9/2000  Maurio et al. ................. 388/811

OTHER PUBLICATIONS

Ishiguro et al., "Output Voltage Control Method of PWM-Controlled Cycloconverters with Space Vectors", The Transactions of the Institute of Electrical Engineers of Japan, vol. 110, No. 6 (1990), pp. 655-663.

Tadano et al., "A Study of Space Vector Modulation Method for Three-Phase to Three-Phase Matrix Converter", Heisei 18 Annual Conference of the Institute of Electrical Engineers of Japan, Industry Society, vol. 1-87 (2006), 4 pgs.

Andou et al., "PWM Control of Three-Phase to Three-Phase Matrix Converter for Reducing Number of Commutations", Heisei 18 Annual Conference of the Institute of Electrical Engineers of Japan, Industry Applications Society, vol. 2006, No. 1 (2006), pp. I-91-I-96.

* cited by examiner

*Primary Examiner* — Adolf Berhane  
*Assistant Examiner* — Yemane Mehari  
(74) *Attorney, Agent, or Firm* — Foley & Lardner LLP

(57) ABSTRACT

[Object] The present invention provides a space vector modulation method for an AC-AC direct conversion device, which can convert input and output waveforms into sine waves and reduce the number of times of switching at an inter-sector shift.

[Means to Solve] A vector state in which a line voltage of multi-phase AC output is expanded onto a two-phase static αβ coordinates is defined. Simple harmonic oscillation vector axes of a sector where an output voltage command value vector Vo* exists are defined as an X axis and a Y axis. Maximum/middle/minimum vectors in each axis, a zero vector that is an intermediate voltage of a phase voltage, and one rotation vector that is present in the sector, are set as base vectors. A switching selection pattern formed by a combination of four vectors among these vectors, which satisfies predetermined conditions, is determined by a selection means 15. On the basis of power source voltage information and output current information, an inverse matrix operation for the four vectors is executed by a duty operation means 14, and a duty solution of the four vectors is determined, then the input and output waveforms are simultaneously converted into the sine waves by the determined duties.

11 Claims, 9 Drawing Sheets

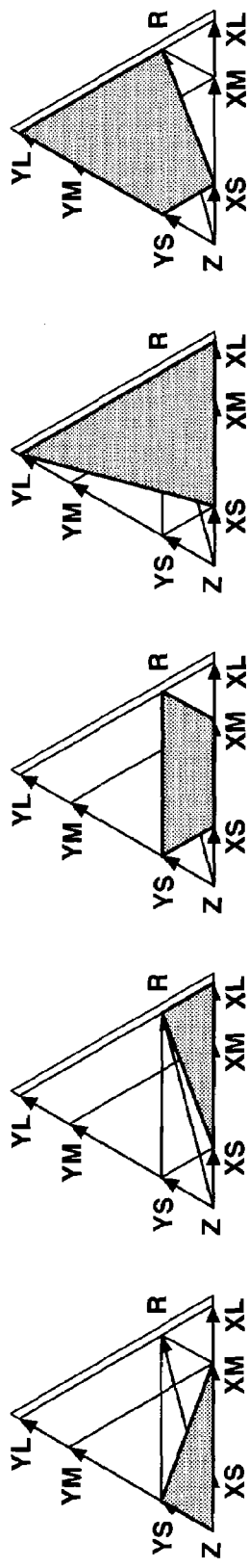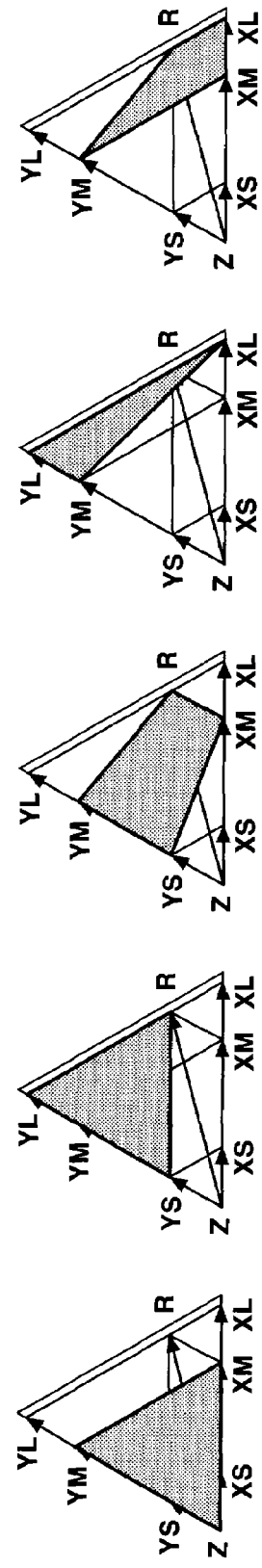
FIG.10A FIG.10B FIG.10C FIG.10D FIG.10E
FIG.10F FIG.10G FIG.10H FIG.10I FIG.10J

MATRIX CONVERTER SPACE VECTOR MODULATION METHOD

TECHNICAL FIELD

The present invention relates to an AC-AC direct conversion device (a matrix converter) obtaining multi-phase output that is converted from multi-phase AC power source to arbitrary voltage or frequency, and particularly to a space vector modulation method by which space vectors whose length•phase momentarily change are represented in input/output respectively and a duty operation is performed by selecting base vectors.

BACKGROUND ART

This kind of AC-AC direct conversion device previously existing is a conversion device which quickly switches a bidirectional switch having self arc-extinguishing type semiconductor elements and converts a single-phase or multi-phase AC input to power of arbitrary voltage or frequency, and it is configured as shown in FIG. 1.

FIG. 1 shows a basic configuration of a three-phase/three-phase AC-AC direct conversion device. A three-phase AC power source 1 is connected to an arbitrary load 4 through an input filtering part 2 formed by a reactor and a capacitor and a semiconductor power conversion part 3 formed by nine bidirectional switches SW1~SW9. Regarding the nine bidirectional switches SW1~SW9, although its detailed configuration manner, such as a case where the bidirectional switches SW1~SW9 are configured by 18 reverse-blocking IGBTs and a case where the bidirectional switches SW1~SW9 are configured by combination between a semiconductor element of a normal IGBT etc. and a diode, is not limited, the bidirectional switches SW1~SW9 are configured by switching elements that can bidirectionally exchange power.

Here, as shown in FIG. 1, in the following, power source three phases are expressed as RST phases, and output three phases are expressed as UVW phases.

The AC-AC direct conversion device, typified by the matrix converter, is a device that directly converts power from AC to AC as a configuration of combination between a voltage-fed power converter that generates an output voltage by PWM-controlling a power source voltage and a current-fed power converter that generates a power source current by the PWM-control with an output load current regarded as source of current. To simultaneously achieve both controls by the nine bidirectional switches, both are linked with each other in the control (namely that the controls have constraints that three-phase instantaneous effective power exchanged by input and output is required to be coincident with each other).

Next, on the basis of the foregoing, a space vector of the AC-AC direct conversion device will be defined. Since the output voltage is generated from the AC power source voltage by the PWM and an input current is also generated from the AC load current by the PWM, unlike a space vector of a normal DC-AC conversion device (inverter), a PWM-controlled instantaneous space vector which the AC-AC direct conversion device can produce momentarily varies. The variation of the instantaneous space vector of the output side voltage depends on phase•magnitude of the power source voltage that is a source chopped up by PWM. The instantaneous space vector of the input side current varies depending on phase•magnitude of the output load current.

With respect to a switching pattern of the AC-AC direct conversion device, there is a need to provide constraints that (1) the power source must never be shorted, (2) the load current must not be a discontinuous current. (1) is for preventing an overcurrent breakage caused by the power source short circuit, and (2) is for preventing an overvoltage failure caused by energy stored in an inductance of inductive load. When taking these conditions into consideration, the switching patterns of the nine bidirectional switches SW1~SW9 are limited to 27 ($3^3$) varieties of combinations.

When expanding the 27 ($3^3$) varieties of switching patterns for the input side and output side onto a static αβ coordinates, they can be represented as shown in FIGS. 2A, 2B and Table 1 (FIG. 2A shows space vectors of the input side current at output load current phase 15 degrees, FIG. 2B shows space vectors of the output side voltage at power source voltage phase 15 degrees).

TABLE 1

| Group | | State | | MC I/O connect | | | MC switch ON state | | |
|---|---|---|---|---|---|---|---|---|---|
| | | | | U | V | W | U | V | W |
| S1 | simple harmonic oscillation | 1 | s1-1a | R | S | S | 1 | 5 | 8 |
| | | 2 | s1-1b | S | R | R | 2 | 4 | 7 |
| | | 3 | s1-2a | S | T | T | 2 | 6 | 9 |
| | | 4 | s1-2b | T | S | S | 3 | 5 | 8 |
| | | 5 | s1-3a | T | R | R | 3 | 4 | 7 |
| | | 6 | s1-3b | R | T | T | 1 | 6 | 9 |
| S2 | simple harmonic oscillation | 7 | s2-1a | S | R | S | 2 | 4 | 8 |
| | | 8 | s2-1b | R | S | R | 1 | 5 | 7 |
| | | 9 | s2-2a | T | S | T | 3 | 5 | 9 |
| | | 10 | s2-2b | S | T | S | 2 | 6 | 8 |
| | | 11 | s2-3a | R | T | R | 1 | 6 | 7 |
| | | 12 | s2-3b | T | R | T | 3 | 4 | 9 |
| S3 | simple harmonic oscillation | 13 | s3-1a | S | S | R | 2 | 5 | 7 |
| | | 14 | s3-1b | R | R | S | 1 | 4 | 8 |
| | | 15 | s3-2a | T | T | S | 3 | 6 | 8 |
| | | 16 | s3-2b | S | S | T | 2 | 5 | 9 |
| | | 17 | s3-3a | R | R | T | 1 | 4 | 9 |
| | | 18 | s3-3b | T | T | R | 3 | 6 | 7 |
| R1 | counter-clockwise rotation | 19 | r1-1 | R | S | T | 1 | 5 | 9 |
| | | 20 | r1-2 | T | R | S | 3 | 4 | 8 |
| | | 21 | r1-3 | S | T | R | 2 | 6 | 7 |
| R2 | clockwise rotation | 22 | r2-1 | R | T | S | 1 | 6 | 8 |
| | | 23 | r2-2 | S | R | T | 2 | 4 | 9 |
| | | 24 | r2-3 | T | S | R | 3 | 5 | 7 |
| Z | null | 25 | z1 | R | R | R | 1 | 4 | 7 |
| | | 26 | z2 | S | S | S | 2 | 5 | 8 |
| | | 27 | z3 | T | T | T | 3 | 6 | 9 |

In Table 1, the space vectors are separated into the following six groups; a simple harmonic oscillation vector S1 which is a group of simple harmonic oscillation vector with a direction of phase angle 30 degrees being a positive axis, a simple harmonic oscillation vector S2 with a direction of phase angle 150 degrees being a positive axis, a simple harmonic oscillation vector S3 with a direction of phase angle 270 degrees being a positive axis, a rotation vector R1 whose length is a maximum and constant and which rotates counterclockwise, a rotation vector R2 whose length is constant and which rotates clockwise, and a zero vector Z which is fixed at a center zero point of hexagon. Each of these base vectors depends on phase θ of an input voltage, i.e. each of these base vectors varies in synchronization with angular velocity $\omega_i$ of the input voltage. Further, a length of the vector (size of the hexagon) corresponds to a magnitude of an input line voltage.

As described above, because the instantaneous space vector momentarily changes, the vector varies with the each phase. When focusing attention on a direction of the variation of the instantaneous space vector in the static αβ coordinates, 27 varieties of vectors can be classified into 18 varieties of simple harmonic oscillation vectors (6 varieties of vectors for each of three axes, phase relationship is constant) and 6 varieties of rotation vectors (3 varieties of vectors in the clockwise direction and 3 varieties of vectors in the counterclockwise direction, each length of them is constant) and 3 varieties of zero vectors (it is unchangeable at an origin point).

Table 1 is an example in which the 27 varieties of patterns are classified with the output side space vector being a reference. Such basic idea of the space vector is already known by a Non-Patent Document 1 etc.

Next, an idea of the space vector will be simply explained. For instance, in the output side space vector, when focusing attention on a state 1: a connection pattern of UVW=RSS in Table 1, a three-phase AC of the output has phase differences of each 120 degrees in order of U phase→V phase→W phase. Since the output side space vector is defined with U phase being α axis (S1 axis in FIG. 2) here, V phase is an S2 axis direction, W phase is an S3 axis direction.

In the state 1: UVW=RSS, same as the example of FIG. 2, when the power source voltage phase θ is 15 degrees, a relationship of the power source phase voltage becomes a relationship of vr>0>vs>vt. Thus, in the state 1, Vu*=Vr, Vv*=Vs, Vw*=Vs. Since Vr is a positive voltage and Vs is a negative voltage, when synthesizing Vu*, Vv* and Vw*, as shown by vRSS in FIG. 2, the output side space vector is outputted in S1 axis positive direction. Also regarding the other instantaneous space vectors, they can be expanded likewise.

Now, as shown in FIG. 3, a domain of the input side space vector is divided for each 30 degree phase as shown in FIG. 3A, and a domain of the output side space vector is divided for each 60 degree phase as shown in FIG. 3B, and numbers are given. In the following, these are called sectors. The sector can be discriminated when determining input phase θ and output phase φ from the following three-phase two-phase conversion (αβ conversion) and trigonometric function.

[Expression 1]

$$\begin{bmatrix} Vi\alpha \\ Vi\beta \end{bmatrix} = \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} Vr \\ Vs \\ Vt \end{bmatrix}, \quad (1)$$

$$\begin{bmatrix} Ii\alpha^* \\ Ii\beta^* \end{bmatrix} = \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} Ir^* \\ Is^* \\ It^* \end{bmatrix},$$

$$\begin{bmatrix} Vo\alpha^* \\ Vo\beta^* \end{bmatrix} = \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} Vu^* \\ Vv^* \\ Vw^* \end{bmatrix}$$

[Expression 2]

$$\theta_{in} = \tan^{-1}\left(\frac{Ii\beta^*}{Ii\alpha^*}\right) \text{ when power factor is 1} \quad (2)$$

$$\theta_{in} = \tan^{-1}\left(\frac{Vi\beta}{Vi\alpha}\right),$$

$$\theta_{out} = \tan^{-1}\left(\frac{Vo\beta^*}{Vo\alpha^*}\right)$$

Here, as a present invention-related art, a space vector modulation method of the matrix converter described in a Non-Patent Document 2, and a PWM control method of the matrix converter described in a Non-Patent Document 3, etc. are known.

In previously existing typical control systems (for example, the Non-Patent Document 2), there are many systems in which input and output waveforms can be converted to sine waves without using output load current information. Since information required for the PWM-control of the matrix converter is only information of phase (or phase and magnitude) of three-phase AC power source voltage and also information of an output current detection value is not included in an operation, the control can meet an open-loop control.

On the other hand, when focusing attention on the number of times of switching within one control cycle, in the case of the previously existing typical control systems, it is four times or more (when counting within carrier one cycle, it is eight times or more).

Here, the one control cycle is a PWM cycle. If the system is five-vector modulation system, the cycle is a total time of pulse signals (output times) of five space vectors. It is a unit time required for PWM of the five instantaneous space vectors, i.e. a unit time required to fit the five instantaneous space vectors to a command value through integration (on average), and normally, update of the command value is also synchronized with this unit time.

However, when applying it to such a triangular wave carrier comparison system as described in the Non-Patent Document 3, because it corresponds to a case where the command value is updated at a peak and a valley of the triangular wave, a generally-called carrier frequency becomes ½ times of a control frequency.

For example, carrier 5 kHz→control frequency 10 kHz (one control cycle=100 μs). If the system is five-vector system, one control cycle is organized by five PWM pulses, namely, that the number of times of switching is four times. Further, in a case of four-vector modulation system, one control cycle is organized by four PWM pulses, and the number of times of switching is three times.

Non-Patent Document 1: Akio Ishiguro, Takeshi Furuhashi, Muneaki Ishida, Shigeru Okuma, Yoshiki Uchikawa: "Output Voltage control Method of PWM-Controlled Cycloconverters with Space Vectors", The Transactions of the Institute of Electrical Engineers of Japan, Vol. 110, No. 6, pp, 655-663 (1990)

Non-Patent Document 2: Yugo Tadano, Shota Urushibata, Masakatsu Nomura, Tadashi Ashikaga: "A Study of Space Vector Modulation Method for Three-Phase to Three-Phase Matrix Converter", Heisei 18 Annual Conference of the Institute of Electrical Engineers of Japan, Industry Society, 1-87 (2006)

Non-Patent Document 3: Yusuke Andou, Takaharu Takeshita: "PWM Control of Three-Phase to Three-Phase Matrix Converter for Reducing Number of Commutations", Heisei 18 Annual Conference of the Institute of Electrical Engineers of Japan, Industry Society, 1-04-4 (2006)

DISCLOSURE OF THE INVENTION

Problems Solved by the Invention

In a control method described in Non-Patent Document 1, only an output is controlled and converted to a sine wave, and there is a problem that an input waveform contains higher harmonics. If only the output voltage is needed to be converted to the sine wave, this can be achieved by selecting three space vectors and controlling them. However, since an input current at that time is not controlled, the waveform contains a higher harmonic distortion.

The vector modulation system described in the Non-Patent Document 2 is a method in which, after selecting five space vectors according to a course of control, an operation of duty is performed using pseudo-inverse matrix, and this method can convert the input and output waveforms to the sine waves. In a case where also the input current is simultaneously converted to the sine wave in addition to the output, since two degrees of freedom of α component, β component of the input current are further required, the control is executed using the five space vectors.

However, because of the five-vector modulation system, the number of times of switching within one control cycle is four times, and due to switching loss caused by this four commutations, a system efficiency is lowered.

In the Non-Patent Document 3, the operation of duty is performed every three phases and a PWM waveform is generated through the triangular wave carrier comparison system. This is effective in the case of reduction of output line voltage higher harmonics. However, since the reduction of output voltage higher harmonics is paramount, input current pulsation is increased compared with conventional systems.

In addition, since the carrier comparison is performed after the duty operation and the PWM pulse is determined, there is no degree of freedom in arrangement order of the PWM pulse. And at a change of mode (at a inter-sector shift, e.g. when the sector shifts from sector 1 to sector 2 in FIG. 3), the PWM pulses cannot be arranged such that the number of times of switching is reduced. The reduction of the number of times of switching upon the inter-sector shift is not taken into consideration.

The present invention is the one that solves the above problems, and its object is to provide a space vector modulation method of an AC-AC direct conversion device which is capable of converting the input and output waveforms to the sine waves and reducing the number of times of switching upon the inter-sector shift.

Means to Solve the Problems

In an embodiment of the present invention to solve the above problems, a space vector modulation method for a multi-phase AC-AC direct conversion device that PWM-controls bidirectional switches with space vector modulation by a direct AC/AC conversion system, the space vector modulation method for the AC-AC direct conversion device comprises: defining a vector state in which a line voltage of multi-phase AC output is expanded onto a two-phase static αβ coordinates; defining a phase-lagging simple harmonic oscillation vector axis and a phase-leading simple harmonic oscillation vector axis in a sector where an output voltage command value vector Vo* exists as an X axis and a Y axis respectively; setting maximum voltage vectors $X_L$, $Y_L$, middle vectors $X_M$, $Y_M$ and minimum vectors $X_S$, $Y_S$ in the each axis, a zero vector Z that is an intermediate voltage phase of a power source, and a rotation vector R that is one rotation vector existing in the sector, as base vectors; determining a switching selection pattern formed by a combination of four vectors among the eight varieties of vectors, which satisfies predetermined conditions for reducing higher harmonics of an input current and/or an output voltage, deriving a duty coefficient matrix associated with the input and output for the four vectors of this selection pattern on the basis of power source voltage information and output current information; calculating its inverse matrix and determining a duty solution of the four vectors; and converting input and output waveforms into sine waves simultaneously by the determined duty solution.

In an embodiment of the present invention, the predetermined conditions have at least one or more conditions from the following conditions: the input waveform and the output waveform can be simultaneously converted into the sine waves, a vector whose voltage difference from a command value when viewed toward a line voltage vector direction is a maximum is not selected, a switching transition every one phase is possible, a direct commutation between a maximum voltage phase and a minimum voltage phase of the power source does not occur upon the switching transition, and the zero vector of the intermediate voltage phase of the power source is used all the time.

In an embodiment of the present invention, of all the space vectors of the AC-AC direct conversion device, an output side space vector is listed in tabular form as coefficients of a three-phase two-phase converted α component $Vi\alpha$ of a power source phase voltage detection value and a three-phase two-phase converted β component $Vi\beta$ of the power source phase voltage detection value, an input side space vector is listed in tabular form as coefficients of a three-phase two-phase converted α component $Io\alpha$ of an output load current detection value and a three-phase two-phase converted β component $Io\beta$ of the output load current detection value, and the duty solution of the four vectors is determined by using the table.

In an embodiment of the present invention, when determining the duty solution, a check is previously made whether the inverse matrix is present for the each selection pattern of the four vectors, and a selection pattern, the duty solution of which can be obtained, is used as a final duty.

In an embodiment of the present invention, when determining the duty solution, the operation is performed with a row whose duty addition value becomes 1 eliminated in the duty coefficient matrix.

In an embodiment of the present invention, as the selection pattern, on the basis of magnitude of the output voltage command value, in a case of a low output voltage area, a selection pattern containing the zero vector is used, and in a case of a high output voltage area, a selection pattern containing no zero vector is used.

In an embodiment of the present invention, a determinant of the duty coefficient matrix whose inverse matrix is present is previously listed in tabular form for the selection patterns, and the duty solution of the four vectors is determined by using the table.

In an embodiment of the present invention, the selection pattern is fixed according to lag or lead of a rotation vector phase in the sector of the output side space vector.

In an embodiment of the present invention, the selection pattern is fixed according to comparison of magnitude of a connection between the middle voltage vectors $X_M$ and $Y_M$ of the simple harmonic oscillation vectors and the output voltage command value.

In an embodiment of the present invention, as the selection pattern, a selection pattern having two levels is used in preference to the others.

In an embodiment of the present invention, at a time when the current detection value is small or at an initial operating start-up, the operation for determining the duty solution of the four vectors is performed on the basis of the power source voltage information and an output current command value.

Effects of the Invention (1) According to the embodiments of the present invention, the input/output waveforms can be converted to the sine waves by the four vectors using the power source voltage information and the output current information. Since the modulation is carried out by the four vectors, the number of times of switching within one control cycle can be reduced from conventional four times to three times. As a result of the reduction of the number of times of switching, since the switching loss can be decreased, the efficiency can be improved.

(2) According to an embodiment of the present invention, since the five conditions are provided, the higher harmonics can be reduced, and output current pulsation can also be reduced with low noise. Further, when focusing attention on an output peak value of the PWM pulse, since the switching is carried out through an intermediate phase of an input voltage, the output is made in order in which a voltage change becomes as small as possible. Therefore, this is effective in reducing the loss caused by the voltage change and achieving low noise. Moreover, also regarding a shift range of a neutral voltage (common mode voltage) of motor load etc., it can be theoretically suppressed to a minimum.

(3) According to an embodiment of the present invention, an operation load for determining the duty solution can be lightened.

(4) According to an embodiment of the present invention, in either case of the low output voltage area or the high output voltage area, a proper selection pattern can be selected, and it is possible to reduce the output voltage higher harmonics.

(5) According to an embodiment of the present invention, by setting the system to readily discriminate whether the inverse matrix is present or not, since the selection pattern whose inverse matrix is not present can be excluded from the duty operation process, the operation load can be lightened.

(6) According to an embodiment of the present invention, it is possible to decrease the selection patterns. With this, the duty operation process can be lightened.

(7) According to an embodiment of the present invention, it is possible to further reduce the output voltage higher harmonics.

(8) According to an embodiment of the present invention, even in the case where the current detection value is small, or even at an initial operating start-up, since the duty operation is performed using the current command, an operation error can be prevented.

DESCRIPTION OF THE PREFERRED EMBODIMENTS

In the following, embodiments of the present invention will be explained with an AC-AC direct conversion device being a matrix converter that PWM-controls bidirectional switches, with reference to drawings. However, the present invention is not limited to the following embodiments.

As use of the matrix converter, generally, the matrix converter vector-controls a motor load. Or as a means of detecting an overcurrent of the load, the matrix converter generally has a means of load current detection such as an output current sensor etc. Thus, using load current information for control is also possible.

Accordingly, in the present invention, by using output current information (e.g. an output current detection value), degree of freedom is reduced by one, and modulation is performed by four space vectors. The present invention then reduces the number of times of switching within one control cycle from conventional four times to three times.

In the case of the carrier comparison system as described in the Non-Patent Document 3, since the PWM pulse can be generated only by comparing a voltage command value with the triangular wave carrier, a control relatively becomes simple. On the other hand, although the space vector modulation system is required to arrange the PWM pulses in arbitrary order from produced duty information, there is degree of freedom in its pulse arrangement order. Thus, also regarding a transient state of the mode change (input/output sector shift etc.; the sector is a domain of phase which is represented by the above expression (2)), it is also possible to instantaneously change the arrangement to reduce the number of times of switching. Further, although the Non-Patent Document 3 treats only the case where the reduction of output voltage higher harmonics takes precedence, the space vector modulation system of the present invention can also be applied to other courses of control according to the use such as a case where the input takes precedence and a case where a locus of magnetic flux vector takes precedence.

(Embodiment 1)

First, in the present embodiment, methods of vector selection and duty operation of a case where minimizing the output voltage higher harmonics is paramount (the minimization of the output voltage higher harmonics takes precedence) will be explained.

Since the matrix converter is required to control input and output simultaneously, if control of the higher harmonics reduction of any one of the input and output takes precedence over the other, pulsation of the other is increased, and such trade-off relationship occurs (see the Non-Patent Document 2). Under a major premise that sine waves of both the input and output are PWM-controlled, since the above trade-off relationship is not avoided, there is a need to previously determine a course of control according to the use.

In the present embodiment, since the reduction of higher harmonics takes precedence, the following constraints are provided.

(1) Both of the input and output are converted to the sine waves.

(2) To reduce change of the line voltage, a vector whose voltage difference from a command value when viewed toward a line voltage vector direction is a maximum is not selected.

(3) Commutation is set every one phase. That is, simultaneous switching of two phases or more is prevented, and the number of times of switching is minimized.

(4) Commutation of an input maximum voltage phase ↔ a minimum voltage phase is prevented. That is, voltage change is reduced always through an intermediate voltage phase, and the switching loss is reduced.

(5) The common mode voltage is reduced always using a zero vector of the intermediate voltage phase of a power source.

In the present invention, the above (1) is a paramount precondition of the course of control. And by using the output current detection value information, this degree of freedom is reduced by one, then four vector system is achieved. Accordingly, the control is carried out by providing command of the sine wave to the input•output using the four space vectors+the output current information (a conditional expression is an after-mentioned expression (11)).

Regarding the above (2), such a vector as the voltage change becomes small when viewed toward line voltage vector directions (both positive and negative directions) of Vuv, Vvw and Vwu, i.e. toward directions of [30+60n] degrees (an integer of $0 \leq n \leq 5$), is selected. A magnitude of voltage command value at that time is also viewed toward the line voltage direction, and a farthest vector group is not used.

For instance, in order that the reduction of output line voltage higher harmonics overrides a conventional system (e.g. a virtual indirect type control system) or overrides reduction of input current higher harmonics, an arbitrary one sector within 60 degree phase difference is considered with 8 varieties of vectors as shown in FIG. 4 defined.

Since only one rotation vector exists in one sector all the time, it is denoted by R. With regard to the zero vector, in accordance with the above constraint (5), a zero vector Z of the intermediate voltage phase of the power source voltage is used (if Vr>Vs>Vt, a pattern of SSS is selected).

Although 6 varieties of simple harmonic oscillation vectors exist in one sector, since the vectors used are two axes, a lagging axis is X axis and a leading axis is Y axis from a relationship of the phase, and a relationship of large/middle/small of instantaneous voltages, each of which is in simple harmonic motion, is discriminated. Then, a vector whose absolute value is a maximum in X axis is defined as $X_L$, a middle one is defined as $X_M$, and a minimum one is defined as $X_S$. With respect to Y axis, likewise, a vector whose absolute value is a maximum is defined as $Y_L$, a middle one is defined as $Y_M$, and a minimum one is defined as $Y_S$.

When an output voltage of a voltage command value Vo* is high (the vector is long), as shown in FIG. 5, the control is made so that the farthest zero vector when viewed toward the line voltage direction is not selected. On the other hand, the output voltage is low, as shown in FIG. 6, the control is made so that $X_L$, $Y_L$ and R which are in far distance are not selected.

Here, in the sectors defined in FIG. 3, as an example, a case of a phase state of an input sector "1" and an output sector "1" is raised (that is, Vr>Vs>Vt, Vu*>Vv*>Vw*). 8 varieties of vectors in the output sector at this time are, $X_L$=RTT, $X_M$=RSS, $X_S$=STT, $Y_L$=RRT, $Y_M$=RRS, $Y_S$=SST, R=RST, and Z=SSS, from FIG. 2B, FIG. 5 and FIG. 6.

When taking account of the above constraints (3) and (4) upon considering switching transition of the above 8 varieties of vectors, a transition diagram as shown in FIG. 7 can be drawn. In FIG. 7, any transition is switched through S phase that is the input intermediate phase, and simultaneous switching of two or more does not occur.

When considering combinations in which the transition occurs by selecting the four vectors from among 27 varieties of switching patterns from the transition diagram of FIG. 7, they are limited to 10 selection patterns 1~10 as shown in Table 2 (Patterns 11~20 are transition modes which could appear under the other input and output sector states. In this example, only the patterns 1~10 can satisfy the constraints.).

TABLE 2

| selection pattern | vector number | | | |
|---|---|---|---|---|
| | v1 | v2 | v3 | v4 |
| 1 | $X_S$ | $Y_S$ | Z | $X_M$ |
| 2 | $X_S$ | $X_L$ | R | $X_M$ |
| 3 | $X_S$ | $Y_S$ | R | $X_M$ |
| 4 | $X_S$ | $X_L$ | R | $Y_L$ |
| 5 | $X_S$ | $Y_S$ | R | $Y_L$ |
| 6 | $Y_S$ | Z | $X_M$ | $Y_M$ |
| 7 | $Y_S$ | R | $Y_L$ | $Y_M$ |
| 8 | $Y_S$ | R | $X_M$ | $Y_M$ |
| 9 | $X_L$ | R | $Y_L$ | $Y_M$ |
| 10 | $X_L$ | R | $X_M$ | $Y_M$ |
| 11 | $Y_S$ | $X_S$ | Z | $Y_M$ |
| 12 | $Y_S$ | $Y_L$ | R | $Y_M$ |
| 13 | $Y_S$ | $X_S$ | R | $Y_M$ |
| 14 | $Y_S$ | $Y_L$ | R | $X_L$ |
| 15 | $Y_S$ | $X_S$ | R | $X_L$ |
| 16 | $X_S$ | Z | $Y_M$ | $X_M$ |
| 17 | $X_S$ | R | $X_L$ | $X_M$ |
| 18 | $X_S$ | R | $Y_M$ | $X_M$ |
| 19 | $Y_L$ | R | $X_L$ | $X_M$ |
| 20 | $Y_L$ | R | $Y_M$ | $X_M$ |

Here, vector numbers v1~v4 in Table 2 mean the four vectors. When the transition is carried out in order of v1→v2→v3→v4 or in its reverse order, the transition can be made while satisfying the above constraints. The vectors return in such order of v1→v2→v3→v4→v4→v3→v2→v1→v1→v2→ ..., then the switching is carried out.

As described above, the combinations in which the four vectors are selected and the transition is carried out are limited to 10 patterns, and one combination is selected (the pattern is selected) from among these combinations. In the present embodiment, duties (pulse output time ratio) of the four vectors for each of 10 patterns are calculated, and a method of elimination by which the pattern whose solution becomes improper is excluded, is employed.

In the following, the duty operation method proposed in the present embodiment will be explained. First, all the 27 varieties of switching patterns of the matrix converter are resolved into α axis component and β axis component of the static αβ coordinates for each of the input side space vectors and the output side space vectors. As a representative here, the state 1: RSS in Table 1 will be explained.

In the output side space, since Vu*=Vr, Vv*=Vs, Vw*=Vs, when operating the three-phase two-phase conversion of these, the following expression is derived.

[Expression 3]

$$\begin{bmatrix} Vo\alpha \\ Vo\beta \end{bmatrix}_{RSS} = \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} Vu^* \\ Vv^* \\ Vw^* \end{bmatrix} \quad (3)$$

$$= \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} Vr \\ Vs \\ Vs \end{bmatrix}$$

$$= \begin{bmatrix} \sqrt{\frac{2}{3}} \cdot Vr - \frac{2}{\sqrt{6}} \cdot Vs \\ 0 \end{bmatrix}$$

On the other hand, when replacing Vr, Vs and Vt with a relational expression of Viα and Viβ using a two-phase three-phase conversion expression, the following expression is derived.

[Expression 4]

$$\begin{bmatrix} Vr \\ Vs \\ Vs \end{bmatrix} = \sqrt{\frac{2}{3}} \cdot \begin{bmatrix} 1 & 0 \\ -\frac{1}{2} & \frac{\sqrt{3}}{2} \\ -\frac{1}{2} & -\frac{\sqrt{3}}{2} \end{bmatrix} \cdot \begin{bmatrix} Vi\alpha \\ Vi\beta \end{bmatrix} \quad (4)$$

[Expression 5]

$$\begin{bmatrix} Vo\alpha \\ Vo\beta \end{bmatrix}_{RSS} = \begin{bmatrix} \sqrt{\frac{2}{3}} \cdot Vr - \frac{2}{\sqrt{6}} \cdot Vs \\ 0 \end{bmatrix} = \begin{bmatrix} Vi\alpha - \frac{1}{\sqrt{3}} \cdot Vi\beta \\ 0 \end{bmatrix} \quad (5)$$

Also regarding instantaneous space vectors Voα and Voβ other than the above vectors, these can be derived as the relational expression of Viα and Viβ likewise. This is generalized as follows, and a coefficient table of Viα and Viβ for every 27 varieties of switching pattern is previously generated as shown in Table 3.

TABLE 3

COEFFICIENT DEFINITION OF 27 SWITCHING PATTERN

| | | | | output phase voltage | | | | input current | | | |
|---|---|---|---|---|---|---|---|---|---|---|---|
| | | | | Voαn coefficient of Viα & Viβ | | Voβn coefficient of Viα & Viβ | | Iiαn coefficient of Ioα & Ioβ | | Iiβn coefficient of Ioα & Ioβ | |
| | I/O | | | | | | | | | | |
| pattern | U | V | W | Kvaa | Kvab | Kvba | Kvbb | Kiaa | Kiab | Kiba | Kibb |
| 1 | R | S | S | 1 | −1/√3 | 0 | 0 | 1 | 0 | −1/√3 | 0 |
| 2 | S | R | R | −1 | 1/√3 | 0 | 0 | −1 | 0 | 1/√3 | 0 |
| 3 | S | T | T | 0 | 2/√3 | 0 | 0 | 0 | 0 | 2/√3 | 0 |
| 4 | T | S | S | 0 | −2/√3 | 0 | 0 | 0 | 0 | −2/√3 | 0 |
| 5 | T | R | R | −1 | −1/√3 | 0 | 0 | −1 | 0 | −1/√3 | 0 |
| 6 | R | T | T | 1 | 1/√3 | 0 | 0 | 1 | 0 | −1/√3 | 0 |
| 7 | S | R | S | −1/2 | 1/2√3 | √3/2 | −1/2 | −1/2 | √3/2 | √3/6 | −1/2 |
| 8 | R | S | R | 1/2 | −1/2√3 | −√3/2 | 1/2 | 1/2 | −√3/2 | −√3/6 | 1/2 |
| 9 | T | S | T | 0 | −1/√3 | 0 | 1 | 0 | 0 | −1/√3 | 1 |
| 10 | S | T | S | 0 | 1/√3 | 0 | −1 | 0 | 0 | 1/√3 | −1 |
| 11 | R | T | R | 1/2 | 1/2√3 | −√3/2 | −1/2 | 1/2 | −√3/2 | √3/6 | −1/2 |
| 12 | T | R | T | −1/2 | −1/2√3 | √3/2 | 1/2 | −1/2 | √3/2 | −√3/6 | 1/2 |
| 13 | S | S | R | −1/2 | 1/2√3 | −√3/2 | 1/2 | −1/2 | −√3/2 | √3/6 | 1/2 |
| 14 | R | R | S | 1/2 | −1/2√3 | √3/2 | −1/2 | 1/2 | √3/2 | −√3/6 | −1/2 |
| 15 | T | T | S | 0 | −1/√3 | 0 | −1 | 0 | 0 | −1/√3 | −1 |
| 16 | S | S | T | 0 | 1/√3 | 0 | 1 | 0 | 0 | 1/√3 | 1 |
| 17 | R | R | T | 1/2 | 1/2√3 | √3/2 | 1/2 | 1/2 | √3/2 | √3/6 | 1/2 |
| 18 | T | T | R | −1/2 | −1/2√3 | −√3/2 | −1/2 | −1/2 | −√3/2 | −√3/6 | −1/2 |
| 19 | R | S | T | 1 | 0 | 0 | 1 | 1 | 0 | 0 | 1 |
| 20 | T | R | S | −1/2 | −√3/2 | √3/2 | −1/2 | −1/2 | √3/2 | −√3/2 | −1/2 |
| 21 | S | T | R | −1/2 | √3/2 | −√3/2 | −1/2 | −1/2 | −√3/2 | √3/2 | −1/2 |
| 22 | R | T | S | 1 | 0 | 0 | −1 | 1 | 0 | 0 | −1 |
| 23 | S | R | T | −1/2 | √3/2 | √3/2 | 1/2 | −1/2 | √3/2 | √3/2 | 1/2 |
| 24 | T | S | R | −1/2 | −√3/2 | −√3/2 | 1/2 | −1/2 | −√3/2 | −√3/2 | 1/2 |
| 25 | R | R | R | 0 | 0 | 0 | 0 | 0 | 0 | 0 | 0 |
| 26 | S | S | S | 0 | 0 | 0 | 0 | 0 | 0 | 0 | 0 |
| 27 | T | T | T | 0 | 0 | 0 | 0 | 0 | 0 | 0 | 0 |

[Expression 6]

$$Vo\alpha n = Kvaan \cdot Vi\alpha + Kvabn \cdot Vi\beta \cdot Vo\beta n = Kvban \cdot Vi\alpha + Kvbbn \cdot Vi\beta \quad (6)$$

Here, n is a recognition number of the selected four vector numbers 1~4, and each of Kvaan, Kvabn, Kvban and Kvbbn is table of coefficient.

Regarding Viα and Viβ, a power source voltage detection value is used. That is, for example, static αβ conversion (three-phase two-phase change) values Viα and Viβ of the power source voltage detection value, detected by for instance an after-mentioned voltage detection means in FIG. 8, are substituted into the expression (5).

In Table 3, Viα indicates a three-phase two-phase converted α component of the power source phase voltage detection value, Viβ indicates a β component likewise. Ioα indicates a three-phase two-phase converted α component of the output load current detection value, Ioβ indicates a β component likewise. Iiα* indicates an α component of an input current command value, Iiβ* indicates a β component likewise. Voα* indicates an α component of an output phase voltage command value, Voβ* indicates a β component likewise.

Further, also in the input side space, likewise, the instantaneous space vectors can be expanded as the coefficient table of the output current information Ioα and Ioβ. As an example, UVW=RSS of the state 1 in Table 1 will be considered. U phase is connected to R phase, and V phase and W phase are connected to S phase. T phase is an open state in which no phase is connected to T phase. With regard to the input current, Ir*=Iu, Is*=Iv+Iw=−Iu, It*=0. Therefore,

[Expression 7]

$$\begin{bmatrix} Ii\alpha^* \\ Ii\beta^* \end{bmatrix}_{RSS} = \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} Ir^* \\ Is^* \\ It^* \end{bmatrix} \quad (7)$$

$$= \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Iu \\ -Iu \\ 0 \end{bmatrix} = \begin{bmatrix} \frac{\sqrt{3}}{2} \cdot Iu \\ -\frac{1}{\sqrt{2}} \cdot Iu \end{bmatrix}$$

[Expression 8]

$$\begin{bmatrix} Iu \\ Iv \\ Iw \end{bmatrix} = \sqrt{\frac{2}{3}} \cdot \begin{bmatrix} 1 & 0 \\ -\frac{1}{2} & \frac{\sqrt{3}}{2} \\ -\frac{1}{2} & -\frac{\sqrt{3}}{2} \end{bmatrix} \cdot \begin{bmatrix} Io\alpha \\ Io\beta \end{bmatrix} \quad (8)$$

When Iu of the expression (8) is substituted into the expression (7), the following expression is derived.

[Expression 9]

$$\begin{bmatrix} Ii\alpha^* \\ Ii\beta^* \end{bmatrix}_{RSS} = \begin{bmatrix} \sqrt{\frac{3}{2}} \cdot Iu \\ -\frac{1}{\sqrt{2}} \cdot Iu \end{bmatrix} = \begin{bmatrix} Io\alpha \\ -\frac{1}{\sqrt{3}} \cdot Io\alpha \end{bmatrix} \quad (9)$$

Likewise, the other instantaneous space vectors are also expanded as the coefficient table of the Ioα and Ioβ.

[Expression 10]

$$Ii\alpha n = Kiaan \cdot Io\alpha + Kiabn \cdot Io\beta$$

$$Ii\beta n = Kiban \cdot Io\alpha + Kibbn \cdot Io\beta \quad (10)$$

Here, n is a recognition number of the selected four vector numbers 1~4, and each of Kiaan, Kiabn, Kiban and Kibbn is table of coefficient.

Regarding Ioα and Ioβ, the output load current detection value is used. That is, static αβ converted values, detected by for instance an after-mentioned current detection means in FIG. 8, are used.

Then, by using the coefficient table (Table 3) of the above instantaneous space vector, duties of the four vectors are calculated. Because of the relational expressions of the output voltage command and the input current command, also because the total of the four duties must be 1, the following expression (11) is established.

[Expression 11]

$$\begin{cases} Vo\alpha^* = Vo\alpha 1 \cdot d1 + Vo\alpha 2 \cdot d2 + Vo\alpha 3 \cdot d3 + Vo\alpha 4 \cdot d4 \\ Vo\beta^* = Vo\beta 1 \cdot d1 + Vo\beta 2 \cdot d2 + Vo\beta 3 \cdot d3 + Vo\beta 4 \cdot d4 \\ Ii\alpha^* = Ii\alpha 1 \cdot d1 + Ii\alpha 2 \cdot d2 + Ii\alpha 3 \cdot d3 + Ii\alpha 4 \cdot d4 \\ Ii\beta^* = Ii\beta 1 \cdot d1 + Ii\beta 2 \cdot d2 + Ii\beta 3 \cdot d3 + Ii\beta 4 \cdot d4 \\ d1 + d2 + d3 + d4 = 1 \end{cases} \quad (11)$$

Here, coefficients of the duties are substituted into the expressions (6) and (10).

However, since the matrix converter controls the input and the output simultaneously, the expression is not established unless the exchange of the three-phase instantaneous effective power is coincident between the input and output sides. That is to say, if the magnitudes and the phases of Vo* and Ii* are independently controlled, a relationship of the effective power is not established, and the simultaneous sine wave conversion of the input and output becomes impossible.

Thus, as the command value, only the output voltage command is used. With respect to the input current, its magnitude is set to be automatically determined according to the load at that time. With regard to the input phase, when it is coincident with the power source voltage phase, a power factor becomes 1. In addition, when the control is executed so that the input phase has a difference from the power source voltage phase, it is also possible to adjust a reactive power of the input side. Hence, as a relational expression of the input current and the power source voltage and its phase difference θ*, the following input side phase relationship of an expression (12) is derived using trigonometric formula etc. (θ* is a command value of the input current phase with respect to the power source voltage phase, that is, it is a phase difference command value. A current leading direction is positive.).

[Expression 12]

$$\frac{Ii\beta^*}{Ii\alpha^*} = \frac{Vi\beta + Vi\alpha \cdot \tan\theta^*}{Vi\alpha - Vi\beta \cdot \tan\theta^*} \quad (12)$$

When substituting this expression (12) into the expression (11) and eliminating Iiα* and Iiβ*, the expression concerning the input current (third and fourth expressions in the expression (11)) is arranged as follows.

[Expression 13]

$$\begin{aligned}
&\{(Kiaa1 \cdot Io\alpha + Kiab1 \cdot Io\beta) \cdot (Vi\beta + Vi\alpha \cdot \tan\theta^*) - \\
&\quad (Kiba1 \cdot Io\alpha + Kibb1 \cdot Io\beta) \cdot \\
&\quad\quad (Vi\alpha - Vi\beta \cdot \tan\theta^*)\} \cdot d1 + \\
&\{(Kiaa2 \cdot Io\alpha + Kiab2 \cdot Io\beta) \cdot (Vi\beta + Vi\alpha \cdot \tan\theta^*) - \\
&\quad (Kiba2 \cdot Io\alpha + Kibb2 \cdot Io\beta) \cdot \\
&\quad\quad (Vi\alpha - Vi\beta \cdot \tan\theta^*)\} \cdot d2 + \\
&\{(Kiaa3 \cdot Io\alpha + Kiab3 \cdot Io\beta) \cdot (Vi\beta + Vi\alpha \cdot \tan\theta^*) - \\
&\quad (Kiba3 \cdot Io\alpha + Kibb3 \cdot Io\beta) \cdot \\
&\quad\quad (Vi\alpha - Vi\beta \cdot \tan\theta^*)\} \cdot d3 + \\
&\{(Kiaa4 \cdot Io\alpha + Kiab4 \cdot Io\beta) \cdot (Vi\beta + Vi\alpha \cdot \tan\theta^*) - \\
&\quad (Kiba4 \cdot Io\alpha + Kibb4 \cdot Io\beta) \cdot \\
&\quad\quad (Vi\alpha - Vi\beta \cdot \tan\theta^*)\} \cdot d4 = 0
\end{aligned} \quad (13)$$

Accordingly, by using the expression (13) and first, second and fifth expressions in the expression (11), the following equation concerning the four duties is derived.

[Expression 14]

$$\begin{bmatrix} Vo\alpha^* \\ Vo\beta^* \\ 0 \\ 1 \end{bmatrix} = \begin{bmatrix} Vo\alpha 1 & Vo\alpha 2 & Vo\alpha 3 & Vo\alpha 4 \\ Vo\beta 1 & Vo\beta 2 & Vo\beta 3 & Vo\beta 4 \\ Kii1 & Kii2 & Kii3 & Kii4 \\ 1 & 1 & 1 & 1 \end{bmatrix} \cdot \begin{bmatrix} d1 \\ d2 \\ d3 \\ d4 \end{bmatrix} \quad (14)$$

※ $Kiin = (Kiaan \cdot Io\alpha + Kiabn \cdot Io\beta) \cdot (Vi\beta + Vi\alpha \cdot \tan\theta^*) -$
$\quad (Kiban \cdot Io\alpha + Kibbn \cdot Io\beta) \cdot (Vi\alpha - Vi\beta \cdot \tan\theta^*)$ n is vector number.

By determining inverse matrix of the duty coefficient matrix, the following four duties can be determined.

[Expression 15]

$$\begin{bmatrix} d1 \\ d2 \\ d3 \\ d4 \end{bmatrix} = \begin{bmatrix} Vo\alpha 1 & Vo\alpha 2 & Vo\alpha 3 & Vo\alpha 4 \\ Vo\beta 1 & Vo\beta 2 & Vo\beta 3 & Vo\beta 4 \\ Kii1 & Kii2 & Kii3 & Kii4 \\ 1 & 1 & 1 & 1 \end{bmatrix}^{-1} \cdot \begin{bmatrix} Vo\alpha^* \\ Vo\beta^* \\ 0 \\ 1 \end{bmatrix} \quad (15)$$

In this manner, the duty operation expression is derived. In the present embodiment, after selecting the selection pattern of the four vectors from Table 2, the four duties are determined by the expression (15), and the PWM pulses are generated according to its output time ratio.

FIG. 8 is a basic control block diagram of the present embodiment (the other embodiments also have the basically same configuration).

In FIG. 8, the same element as that in FIG. 1 is denoted by the same reference sign. The power source voltage is taken in from a three-phase power source voltage of the three-phase AC power source 1 with the power source voltage detected by a certain voltage detection means 11 such as a transformer. In FIG. 8, although the power source voltage is detected on a power source side of the input filtering part 2, the detection position is possible either before or behind the filter. The output load current is detected by a certain current detection means 12 such as a current sensor.

Both the power source voltage•load current value taken in are three-phase two-phase converted through three-phase two-phase conversion means 13a and 13b respectively, and these are used upon performing an duty operation in a duty operation means 14. The output voltage command value and the input phase command value are received from an arbitrary higher-order control system, and these are used for the sector discrimination of the space vector and discrimination of low voltage•high voltage areas etc. upon performing the duty operation and upon selecting the four vectors by a selection means 15. Also regarding phase of the above power source voltage detection value, it is used for the selection of the four vectors.

Then, although the duty operation of the expression (15) is carried out after selecting the four vectors, as the selection pattern of the four vectors, 20 varieties of patterns are present as shown in Table 2. In the case where the constraint of the output voltage higher harmonics reduction is provided, although patterns are limited to 10 varieties of patterns, all of these patterns cannot necessarily be solved in the expression (15) (there is a case where the matrix has no inverse matrix). Since no inverse matrix means that a selection manner of the vector is wrong, the pattern is changed to the other vector selection patterns. In the present embodiment, first, a check is made whether or not the inverse matrix of the duty coefficient matrix for each of 10 varieties of selection patterns is present. The pattern whose solution is obtained is then finally used in a gate signal generation part 16.

Here, in the above explanation, the operation is carried out using the relational expression of α axis direction and β axis direction of the static coordinates through the three-phase two-phase conversion. However, it is also possible to construct an operation expression by three-phase direction of R, S, T, U, V, W.

A representative example of a simulation result by the present invention is shown in FIG. 9. Waveforms are, from an upper side of the drawing, the power source phase voltage, the input current, the output line voltage, the output current. FIG. 9A is a case where the output voltage command is low, FIG. 9B is a case where the output voltage command is high. The sine wave conversion of both the input/output waveforms is achieved, then a good result can be gained. In addition, since the reduction of the line voltage higher harmonics takes precedence, a high-peak value line voltage is not outputted in the case of the low output voltage command. Conversely, in the case of the high output voltage command, since the zero vector is not used, a high-peak value pulse is outputted. In this manner, since a pulse voltage close to the command value is outputted, it is possible to reduce the higher harmonics and the loss.

(Embodiment 2)

In the embodiment 1, as the duty coefficient matrix, the 4×4 matrix like the expression (15) is used. Here, when focusing attention on an equation of "a duty addition value=1" of 4$^{th}$ row in the expression (15), the coefficient matrix is always 1. From this, d4 is eliminated and an operation expression is considered as follows.

[Expression 16]

$$\begin{bmatrix} d1 \\ d2 \\ d3 \end{bmatrix} = \begin{bmatrix} Vo\alpha1 - Vo\alpha4 & Vo\alpha2 - Vo\alpha4 & Vo\alpha3 - Vo\alpha4 \\ Vo\beta1 - Vo\beta4 & Vo\beta2 - Vo\beta4 & Vo\beta3 - Vo\beta4 \\ Kii1 - Kii4 & Kii2 - Kii4 & Kii3 - Kii4 \end{bmatrix}^{-1} \cdot \begin{bmatrix} Vo\alpha^* - Vo\alpha4 \\ Vo\beta^* - Vo\beta4 \\ -Kii4 \end{bmatrix} \quad (16)$$

Here, elements of the coefficient matrix are previously calculated as follows.

[Expression 17]

$Vo\alpha1-Vo\alpha4=(Kvaa1-Kvaa4)\cdot Vi\alpha+(Kvab1-Kvab4)\cdot Vi\beta Vo\alpha2-Vo\alpha4=(Kvaa2-Kvaa4)\cdot Vi\alpha+(Kvab2-Kvab4)\cdot Vi\beta Vo\alpha3-Vo\alpha4=(Kvaa3-Kvaa4)\cdot Vi\alpha+(Kvab3-Kvab4)\cdot Vi\beta Vo\beta1-Vo\beta4=(Kvba1-Kvba4)\cdot Vi\alpha+(Kvbb1-Kvbb4)\cdot Vi\beta Vo\beta2-Vo\beta4=(Kvba2-Kvba4)\cdot Vi\alpha+(Kvbb2-Kvbb4)\cdot Vi\beta Vo\beta3-Vo\beta4=(Kvba3-Kvba4)\cdot Vi\alpha+(Kvbb3-Kvbb4)\cdot Vi\beta Kii1-Kii4=((Kiaa1-Kiaa4)\cdot Io\alpha+(Kiab1-Kiab4)\cdot Io\beta)\cdot(Vi\beta+Vi\alpha\cdot\tan\theta^*)-((Kiba1-Kiba4)\cdot Io\alpha+(Kibb1-Kibb4)\cdot Io\beta)\cdot(Vi\alpha-Vi\beta\cdot\tan\theta^*) Kii2-Kii4=((Kiaa2-Kiaa4)\cdot Io\alpha+(Kiab2-Kiab4)\cdot Io\beta)\cdot(Vi\beta+Vi\alpha\cdot\tan\theta^*)-((Kiba2-Kiba4)\cdot Io\alpha+(Kibb2-Kibb4)\cdot Io\beta)\cdot(Vi\alpha-Vi\beta\cdot\tan\theta^*) Kii3-Kii4=((Kiaa3-Kiaa4)\cdot Io\alpha+(Kiab3-Kiab4)\cdot Io\beta)\cdot(Vi\beta+Vi\alpha\cdot\tan\theta^*)-((Kiba3-Kiba4)\cdot Io\alpha+(Kibb3-Kibb4)\cdot Io\beta)\cdot(Vi\alpha-Vi\beta\cdot\tan\theta^*)$ (17)

According to the present embodiment, it is possible to simplify the operation from the 4×4 inverse matrix of the embodiment 1 to a 3×3 inverse matrix.

(Embodiment 3)

In the embodiment 1, regarding the 20 varieties of selection patterns of the four vectors in Table 2, the check is made whether the inverse matrix is present or not. In the present embodiment, regarding input•output sector states and a pattern that is not able to be generated in its states, the present embodiment is configured so that an operation of determinant of the duty coefficient matrix is not performed. With this, an operation load can be lightened.

Regarding the 20 varieties of selection patterns in Table 2, first, as shown in Table 4, the patterns are separated into two groups of 1~10 and 11~20.

TABLE 4

| sector mode | selection pattern | vector number | | | |
| --- | --- | --- | --- | --- | --- |
| | | v1 | v2 | v3 | v4 |
| sm1 | 1 | $X_S$ | $Y_S$ | Z | $X_M$ |
| | 2 | $X_S$ | $X_L$ | R | $X_M$ |
| | 3 | $X_S$ | $Y_S$ | R | $X_M$ |
| | 4 | $X_S$ | $X_L$ | R | $Y_L$ |
| | 5 | $X_S$ | $Y_S$ | R | $Y_L$ |
| | 6 | $Y_S$ | Z | $X_M$ | $Y_M$ |
| | 7 | $Y_S$ | R | $Y_L$ | $Y_M$ |
| | 8 | $Y_S$ | R | $X_M$ | $Y_M$ |
| | 9 | $X_L$ | R | $Y_L$ | $Y_M$ |
| | 10 | $X_L$ | R | $X_M$ | $Y_M$ |
| sm2 | 11 | $Y_S$ | $X_S$ | Z | $Y_M$ |
| | 12 | $Y_S$ | $Y_L$ | R | $Y_M$ |
| | 13 | $Y_S$ | $X_S$ | R | $Y_M$ |
| | 14 | $Y_S$ | $Y_L$ | R | $X_L$ |
| | 15 | $Y_S$ | $X_S$ | R | $X_L$ |
| | 16 | $X_S$ | Z | $Y_M$ | $X_M$ |
| | 17 | $X_S$ | R | $X_L$ | $X_M$ |
| | 18 | $X_S$ | R | $Y_M$ | $X_M$ |
| | 19 | $Y_L$ | R | $X_L$ | $X_M$ |
| | 20 | $Y_L$ | R | $Y_M$ | $X_M$ |

Here, each group is called a sector mode 1 (sm1) and a sector mode 2 (sm2). Although both these groups are a pair of pattern groups in which only a relation between X and Y is reversed, from the input and output sector states, a determination whether the constraint of the output voltage higher harmonics reduction is satisfied depending on which group the pattern belongs to is made. When summarizing it, it becomes Table 5.

TABLE 5

| INPUT SECTOR | OUTPUT SECTOR | SECTOR MODE |
|---|---|---|
| 1, 4, 5, 8, 9, 12 | 1, 3, 5 | sm1 |
|  | 2, 4, 6 | sm2 |
| 2, 3, 6, 7, 10, 11 | 1, 3, 5 | sm2 |
|  | 2, 4, 6 | sm1 |

Since sm1 and sm2 can be determined from a relationship of sector between the input and the output, regarding the inverse matrix of the duty operation matrix, there is no need to regularly perform the operations of the 20 patterns, it becomes 10 patterns of half of the 20 patterns. According to the present embodiment, the operation load of the presence check of the inverse matrix is reduced in half.

(Embodiment 4)

In the present embodiment, in addition to the embodiment 3, by checking the magnitude of the output voltage command value, the separation of the low output voltage area and high output voltage area is carried out. It is noted that the patterns 1, 6, 11 and 16 in Table 4 contain the zero vector Z, the other selection patterns contain the rotation vector R.

In the case of the low voltage area, when selecting the selection pattern containing the zero vector, the line voltage higher harmonics can be reduced, which is described above. In the case of the high voltage area, the pattern containing the rotation vector R (the selection pattern containing no zero vector) is used. As its discrimination, the magnitude of the voltage command value when viewed toward the line voltage vector direction is checked, and ½ of a line voltage direction instantaneous value of the largest simple harmonic oscillation vector ($X_L$, $Y_L$, R) is regarded as a line of demarcation. Then, in a case where the line voltage direction instantaneous value of the voltage command value is great, the selection pattern of the high voltage area takes precedence. In a case where the line voltage direction instantaneous value is low, the selection pattern of the low voltage area takes precedence. The line of demarcation is determined by the following expression (18) using for example the magnitude of $X_L$.

[Expression 18]

$$|Vo^*|\cdot\cos\left(\frac{\pi}{6}-\varphi^*\right) > \frac{\sqrt{3}}{2}\cdot|X_L| \Rightarrow \text{HIGH VOLTAGE AREA}$$

$$|Vo^*|\cdot\cos\left(\frac{\pi}{6}-\varphi^*\right) \leq \frac{\sqrt{3}}{2}\cdot|X_L| \Rightarrow \text{LOW VOLTAGE AREA}$$

(18)

Here, $\varphi$ is an angle formed by X axis and the voltage command value Vo*.

According to the present embodiment, since it is possible to discriminate the selection pattern of the four vectors which should be given preference from the magnitude of the voltage command value, the voltage higher harmonics can be reduced.

(Embodiment 5)

In the methods of the embodiments 1 and 2, the 27 varieties of switching patterns applied to the 8 varieties of vectors [$X_L$, $X_M$, $X_S$, $Y_L$, $Y_M$, $Y_S$, R, Z] in one sector are uniquely fixed according to the input and output sector states. For instance, when the input sector is "1" and the output sector is "1", $X_L$=RTT, $X_M$=RSS, $X_S$=STT, $Y_L$=RRT, $Y_M$=RRS, $Y_S$=SST, R=RST, and Z=SSS.

Then, the four vectors are selected, and substituted into the duty coefficient matrix from the coefficient table of each switching pattern. Because of this, if the four vectors are not fixed, the mathematical operation of the duty cannot be done.

Thus, in the present embodiment, regarding the each selection pattern in Table 2, a table of the operation expression itself into which the coefficient is substituted is previously prepared.

An example of the input sector "1" and the output sector "1" will be explained. Here, for the duty operation, the way of the embodiment 2 is used.

Table 6 is a table of an expression for checking whether the inverse matrix of the duty coefficient matrix is present after substituting the coefficient for each selection pattern.

TABLE 6

| Selection Pattern | determinant | Simplified determinant check |
|---|---|---|
| 1 | $-\dfrac{2\,Ioa\,Vib\,(Via^2+Vib^2)}{\sqrt{3}}$ | Ioa = 0 or Vib = 0 |
| 2 | $-\dfrac{2\,Ioa\,Vib\,(Via^2+Vib^2)}{\sqrt{3}}$ | Ioa = 0 or Vib = 0 |
| 3 | $\dfrac{2\,Ioa\,Vib\,(Via^2+Vib^2)}{\sqrt{3}}$ | Ioa = 0 or Vib = 0 |
| 4 | $\dfrac{1}{6}\left(3\,Ioa\,Via - 3\sqrt{3}\,Iob\,Via - \sqrt{3}\,Ioa\,Vib + 3\,Iob\,Vib\right)(Via^2+Vib^2)$ | $3\,Ioa\,Via - 3\sqrt{3}\,Iob\,Via - \sqrt{3}\,Ioa\,Vib + 3\,Iob\,Vib = 0$ |
| 5 | $-\dfrac{1}{6}\left(3\,Ioa\,Via - 3\sqrt{3}\,Iob\,Via - \sqrt{3}\,Ioa\,Vib + 3\,Iob\,Vib\right)(Via^2+Vib^2)$ | $3\,Ioa\,Via - 3\sqrt{3}\,Iob\,Via - \sqrt{3}\,Ioa\,Vib + 3\,Iob\,Vib = 0$ |

TABLE 6-continued

| Selection Pattern | determinant | Simplified determinant check |
|---|---|---|
| 6 | $\frac{1}{6}\left(-3\left(Ioa+\sqrt{3}\ Iob\right)Via+\left(\sqrt{3}\ Ioa+3\ Iob\right)Vib\right)(Via^2+Vib^2)$ | $-3\,(Ioa+\sqrt{3}\,Iob)\,Via+(\sqrt{3}\,Ioa+3\,Iob)\,Vib=0$ |
| 7 | $\frac{1}{6}\left(-3\left(Ioa+\sqrt{3}\ Iob\right)Via+\left(\sqrt{3}\ Ioa+3\ Iob\right)Vib\right)(Via^2+Vib^2)$ | $-3\,(Ioa+\sqrt{3}\,Iob)\,Via+(\sqrt{3}\,Ioa+3\,Iob)\,Vib=0$ |
| 8 | $\frac{1}{6}\left(3\left(Ioa+\sqrt{3}\ Iob\right)Via-\left(\sqrt{3}\ Ioa+3\ Iob\right)Vib\right)(Via^2+Vib^2)$ | $-3\,(Ioa+\sqrt{3}\,Iob)\,Via+(\sqrt{3}\,Ioa+3\,Iob)\,Vib=0$ |
| 9 | $-\frac{1}{3}\left(\sqrt{3}\ Ioa-3\ Iob\right)Vib\,(Via^2+Vib^2)$ | $\sqrt{3}\,Ioa-3\,Iob=0\ or\ Vib=0$ |
| 10 | $\frac{1}{3}\left(\sqrt{3}\ Ioa-3\ Iob\right)Vib\,(Via^2+Vib^2)$ | $\sqrt{3}\,Ioa-3\,Iob=0\ or\ Vib=0$ |

When the duty coefficient matrix is A, if its determinant $|A|\neq 0$, the inverse matrix is present, thus each determinant is shown in the table. Here, since the power source is established during the control of the matrix converter, normally, there is no case where the power source voltage detection values Via and fVib become 0 at the same time. Therefore, $Via^2+Vib^2\neq 0$, and as shown on a right side in Table 6, a discriminant of presence of the inverse matrix can be simplified. Also, the discriminant itself appears with a measure of pattern. Such a table of the inverse matrix presence discriminant is previously expanded for all the sectors, and it is read out from the table in accordance with the input and output sectors, then used. According to the present embodiment, because it is possible to relatively simply discriminate whether the inverse matrix of the coefficient matrix is present or not, the operation load can be lightened.

(Embodiment 6)

The selection patterns of the four vectors used in the matrix converter can be reduced to the 10 patterns by the embodiment 3. But, in order to further lighten the duty operation load, by a certain area discrimination method, the possibility of appearance of the selection pattern could be reduced. However, in the case where the output voltage and the input current are simultaneously converted to the sine wave in the matrix converter, because it also depends on a state of the load connected with the matrix converter, it is not easy to uniquely fix the selection pattern of the four vectors by the area discrimination. Although it is also possible to represent the discriminant with a plurality of expressions, conversely, the operation load might be increased. Thus, in the present embodiment, in a relatively simple way, a method of reducing the selection pattern from 10 patterns to 9 patterns is constructed.

First, from the power source voltage and the output voltage command, the sector discrimination of the input and the output is possible, which is explained above. Here, areas of 10 patterns in an arbitrary output side one sector will be considered. Now, assuming that an inside of the output side sector is the state of FIG. 4, when illustrating an output voltage command area that is able to achieve the selection patterns 1~10 defined in Table 2, it becomes FIG. 10. Here, FIGS. 10A~10J correspond to the patterns 1~10. In order that this selection pattern is selected, the output voltage command must be present at least in a black hatch area in FIGS. 10A~10J.

However, these areas are minimum conditions that satisfy a condition of the output side. Therefore, it must be noted that, even if the output voltage command is present in this area, its selection pattern does not necessarily satisfy a condition of the input current side. Thus, although there are parts that overlap each other in the areas of these 10 patterns, regarding such areas, it is required to select an arbitrary one pattern that satisfies the input condition (in the present embodiment, to avoid complexity, its explanation is omitted).

When focusing attention on the phase of the rotation vector R in FIG. 4 and FIG. 10, as shown in FIG. 11, regarding a lagging side area (2), a pattern 7 (FIG. 10G) is not selected with this rotation vector phase R being a reference. On the other hand, regarding a leading side area (1), a pattern 2 (FIG. 10B) is not selected. Since the rotation vector phase in the sector of the output side space vector can be detected from an input power source voltage phase, when making discrimination of the lag or lead with this phase being a reference, it is possible to omit the duty operation process of the pattern 2 or 7. As a result, reduction of the load for one duty operation can be realized.

(Embodiment 7)

As same as the embodiment 6, as a means for discriminating the area, as shown in FIG. 12, the present embodiment newly considers a connection between the intermediate voltage phases $X_M$ and $Y_M$ of the simple harmonic oscillation vectors in the sector of the output side space vector. From FIG. 10, in a case of an area (1) that is a low voltage side of this connection, the patterns 9 and 10 (FIGS. 10I and 10J) are not selected. On the other hand, in a case of an area (2) that is a high voltage side of this connection, the patterns 1 and 6 (FIGS. 10A and 10F) are not selected. Here, there are some discrimination methods with this connection being a line of demarcation. For instance, if both magnitudes of an $X_M$ cos 30° that is obtained when viewing an $X_M$ instantaneous value fixed by the input power source voltage toward the line voltage direction and an instantaneous value Vo* cos γ (γ is a phase difference from the line voltage direction) of the line voltage direction of the output voltage command Vo* are compared, the areas (1) and (2) can be discriminated.

As described above, by discriminating the areas separated by the connection between the intermediate voltage phases $X_M$ and $Y_M$ of the simple harmonic oscillation vectors in the sector of the output side space vector, the selection patterns of the four vectors can be reduced from the 10 patterns to 8 patterns.

(Embodiment 8)

When combining the above embodiments 6 and 7, as shown in FIG. 13, separation of four areas is possible. The selection patterns are separated as follows.

area (1): except the patterns 7, 9, 10 (1, 2, 3, 4, 5, 6, 8)
area (2): except the patterns 2, 9, 10 (1, 3, 4, 5, 6, 7, 8)
area (3): except the patterns 1, 6, 7 (2, 3, 4, 5, 8, 9, 10)
area (4): except the patterns 1, 2, 6 (3, 4, 5, 7, 8, 9, 10)

Thus, when carrying out the discrimination processes of the embodiments 6 and 7 at once, the duty operation process of the selection pattern of the four vectors can be reduced from the 10 patterns to 7 patterns.

(Embodiment 9)

When using the methods of the present invention, there exists a case where the duty condition is simultaneously satisfied by two selection patterns of the 10 varieties of selection patterns of the four vectors depending on the load condition or the operating state.

Here, in a case where the four duties d1~d4 satisfy the following conditions, the calculated duty is correct.

$$d1+d2+d3+d4=1$$

$$0 \leq dn \leq 1 (n:1\text{~}4)$$

In a case where two or more modes that simultaneously satisfy the duty conditions exist, although any of the modes can be used when considering the controllability, in the present embodiment, a process in which the patterns 4, 5, 9 and 10 in Table 2 are selected in preference to the others is executed.

The reason will be described with the selection pattern 9 being an example. Since the selection pattern 9 is $X_L$, R, $Y_L$, $Y_M$, two simple harmonic oscillation vectors (large) $X_L$ and $Y_L$, one simple harmonic oscillation vector (middle) $Y_M$ and one rotation vector R are used. When viewing these vectors toward the output line voltage vector direction, the simple harmonic oscillation vectors (large) $X_L$ and $Y_L$ and the rotation vector R are the same in magnitude. Therefore, as the voltage peak value of the pulse outputted to the line voltage, it is limited to two levels of "$X_L$, R, $Y_L$" and "$Y_M$". Also regarding the patterns 4, 5 and 10, the same thing can be said. On the other hand, as for the other selection patterns, the peak values of three levels when viewed toward the line voltage direction are used. In order to reduce the output line voltage higher harmonics, it is desirable to minimize the pulse voltage change and the pulse frequency. Thus, the patterns 4, 5, 9 and 10 should be actively used.

Accordingly, when the two-level mode of the patterns 4, 5, 9 and 10 and the three-level mode of the other patterns occur at the same time, the present embodiment executes the process so that a duty operation result of the two-level mode is finally reflected. With this, a further reduction of the output voltage higher harmonics becomes possible.

(Embodiment 10)

The present invention is the vector modulation system by the four vectors using the information of the power source voltage detection value and the output current detection value. However, with respect to the output current detection value, in a case of such a load operating condition that the current instantaneous value is originally small, or in the initial operating state, because of the small current detection value or many errors etc., there is a case where such an unstable mode that the solution of the duty operation cannot be obtained from any of the selection patterns occurs.

Thus, in the present embodiment, a current control operation (at the vector control of the motor load) is premised, and the current command value is used for the duty operation expression of the matrix converter (however, it is effective only in a case where a feedback current control system is in an adequately stable state and a good following is achieved).

Its control configuration is shown in FIG. 14. In FIG. 14, the same element as that in FIG. 8 is denoted by the same reference sign. A current feedback control means 20 receives the output current detection value from the three-phase two-phase conversion mean 13*b*, and also receives the output current command value from the higher-order control system, then outputs the output voltage command to the duty operation means 14 and the selection means 15. In addition, the output current command value is inputted to the duty operation means 14.

In the present embodiment, the current detection value is used for the feedback current control system, and the current command value is used for the duty operation of the matrix converter. With this, in the operation at the initial operating start-up or at such a low output current that the current detection error cannot be neglected, it is possible to stabilize the operation.

Additionally, for example, for a couple of seconds at the operating start-up, or at a time when the output current is an arbitrary value or less, a change from the output current detection value to the current command value could be possible.

(Embodiment 11)

Considering a case where a reasonable operation result cannot be obtained even using the embodiment 10, the control is changed to a conventional system that is capable of performing the operation even by an open-loop in terms of failsafe. For instance, they are an already-commonly-used virtual indirect type modulation system or the space vector modulation system using the five vectors of the Non-Patent Document 2. Since these systems are not required to use the output current information, a certain reasonable duty can be outputted.

Thus, in the operation at the initial operating start-up or at the time of the low current in which the duty operation error is apt to occur, the open-loop type conventional method is used. Under the stable operating condition, the current feedback space vector modulation method of the four vector system (the system using the four vectors) of the present invention is used. With regard to a change condition, it is judged by an arbitrary level from the magnitude of the current detection value. According to the present embodiment, even when the output current is small, the safe and stable operation can be achieved.

BRIEF DESCRIPTION OF THE DRAWINGS

FIG. 2 Figs indicate space vectors.

FIG. 10 Explanation diagrams for explaining output voltage command areas in the embodiment of the present invention.

EXPLANATION OF REFERENCE

Figure 1:
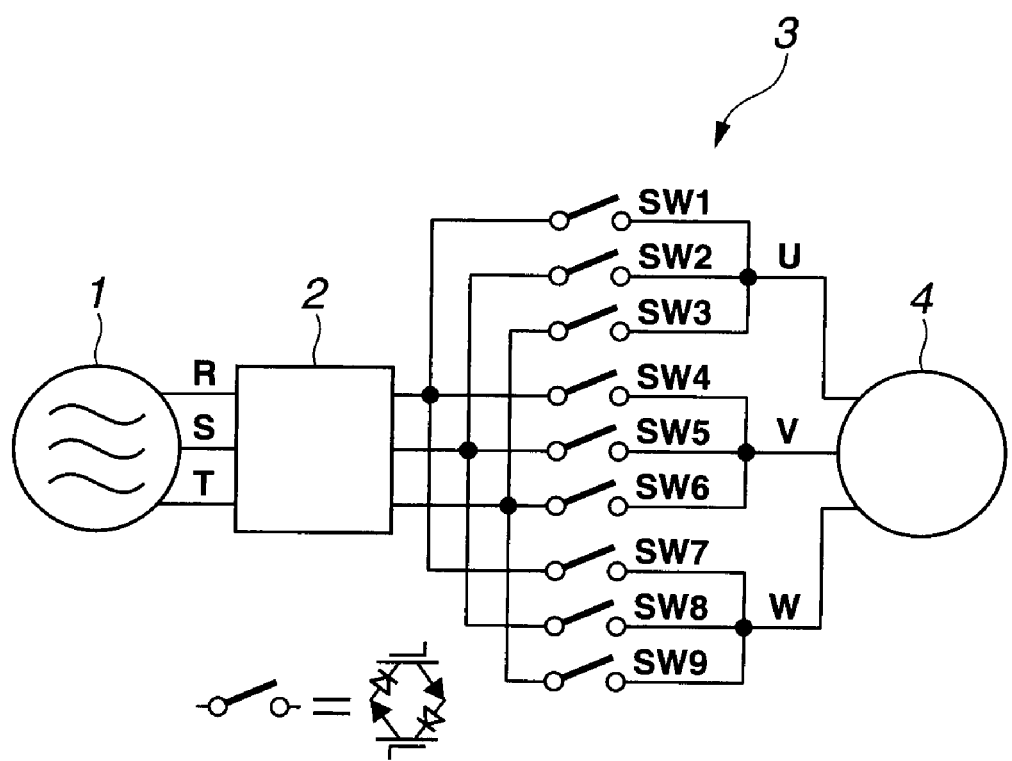
FIG. 1 A basic configuration diagram of an AC-AC direct conversion device to which the present invention is applied.
Figures 2A, 2B:
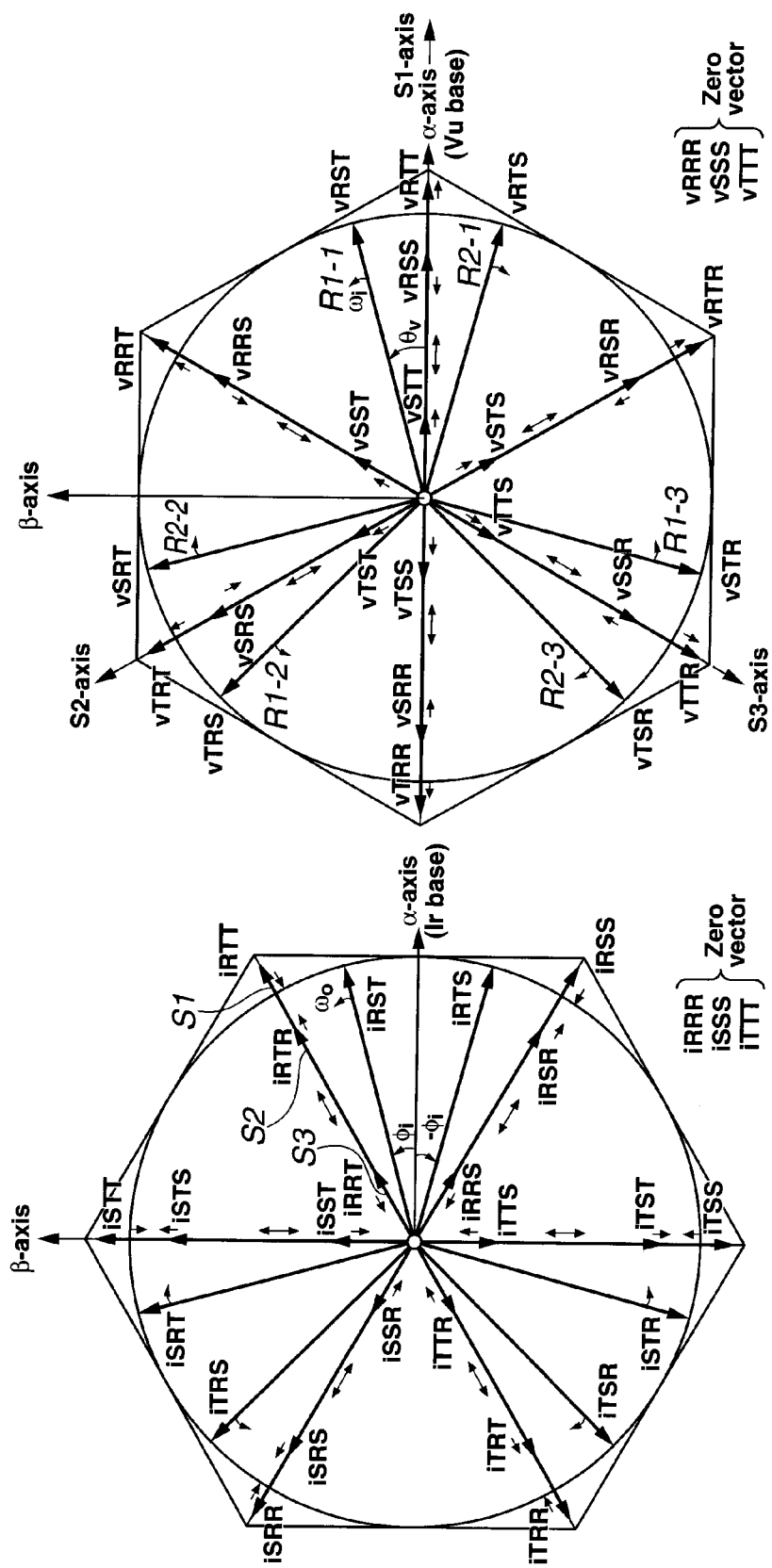
FIG. 2A is an input side space vector diagram.
FIG. 2B is an output side space vector diagram.
Figure 3A:
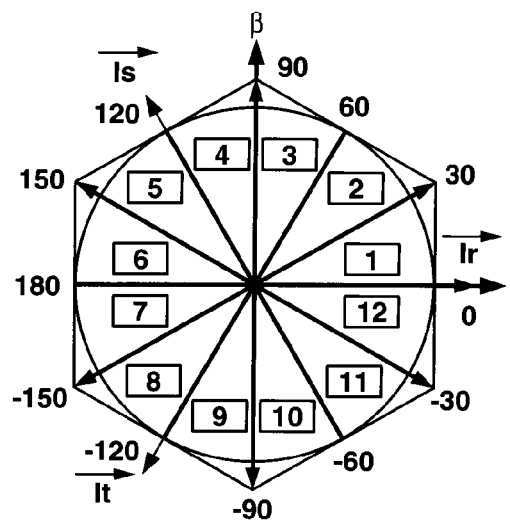
FIG. 3 Explanation diagrams of definition examples of an input side sector and an output side sector of the space vector.
Figure 3B:
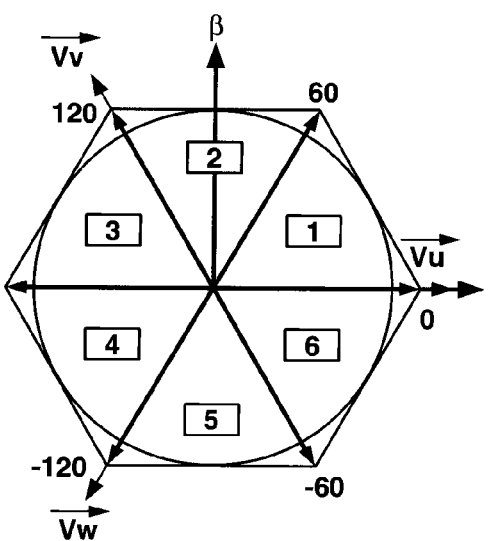
Figure 4:
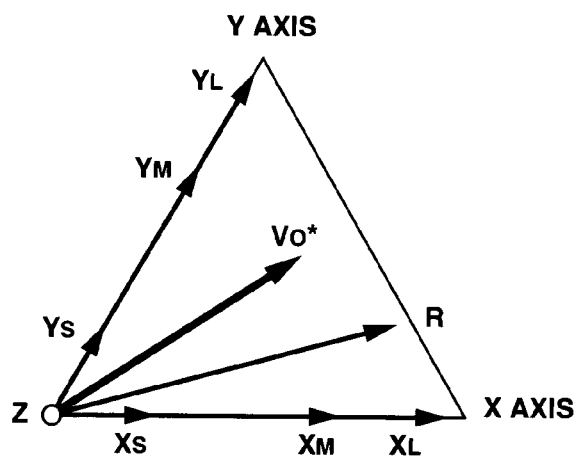
FIG. 4 A phase diagram of the space vector of the output sector "1".
Figure 5:
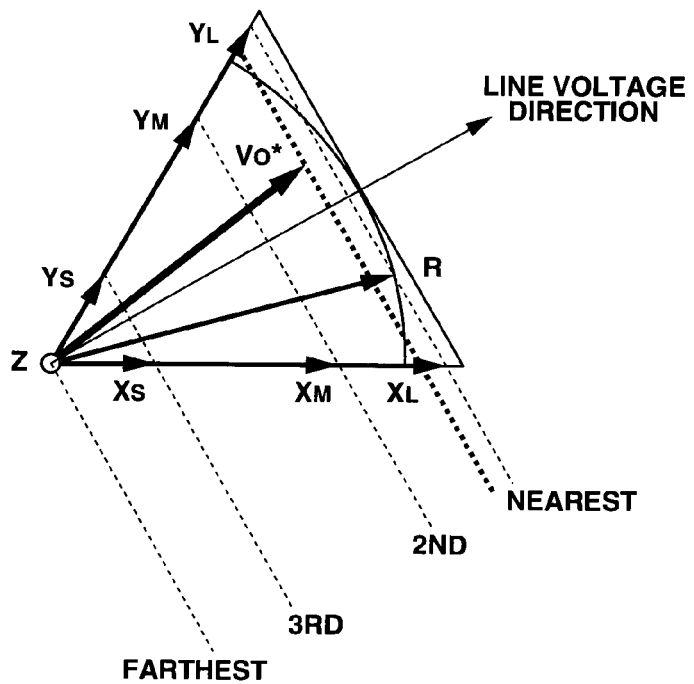
FIG. 5 An explanation diagram for explaining constraints of the present invention.
Figure 6:
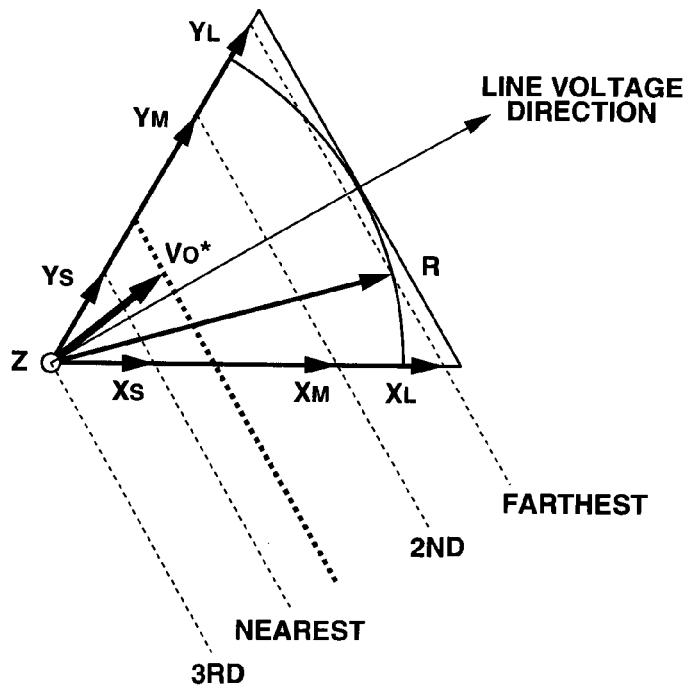
FIG. 6 An explanation diagram for explaining constraints of the present invention.
Figure 7:
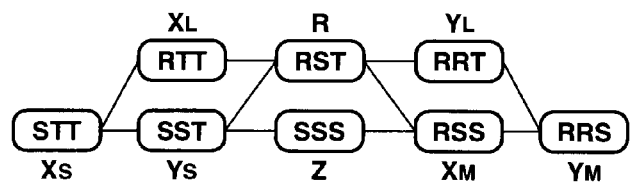
FIG. 7 A switching transition diagram in the method of the present invention.
Figure 8:
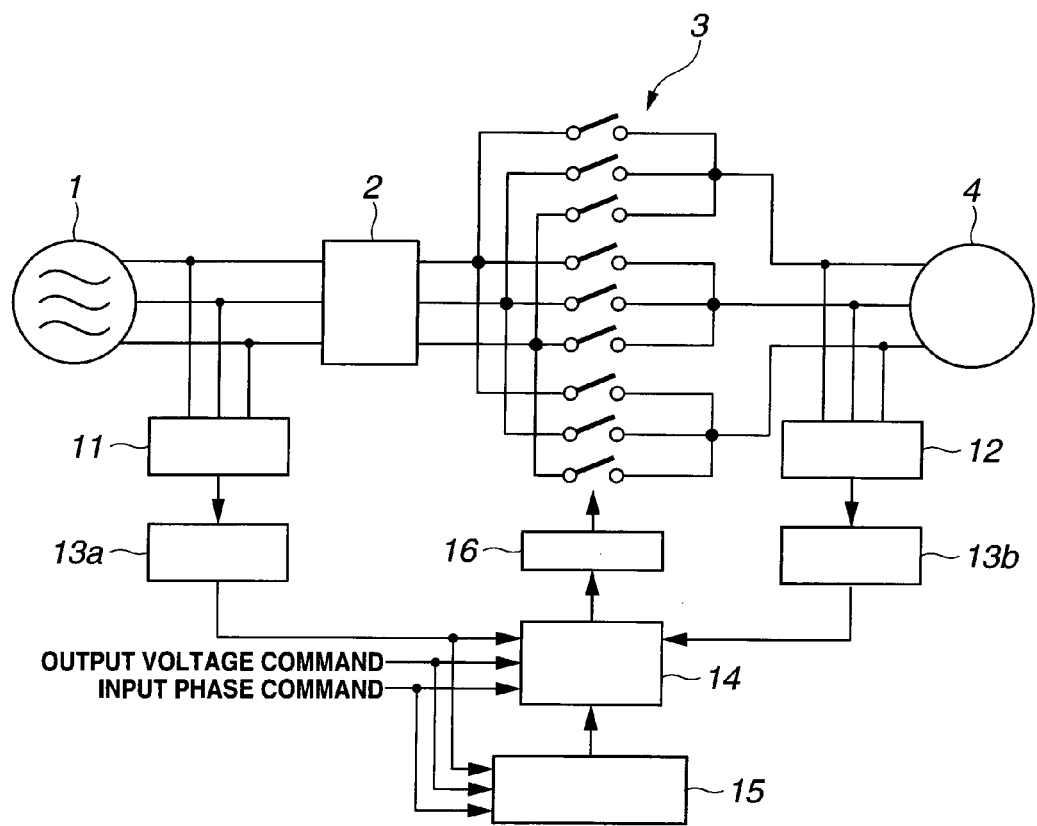
FIG. 8 configuration diagram of a system that executes an embodiment 1 of the present invention.
Figure 9A:
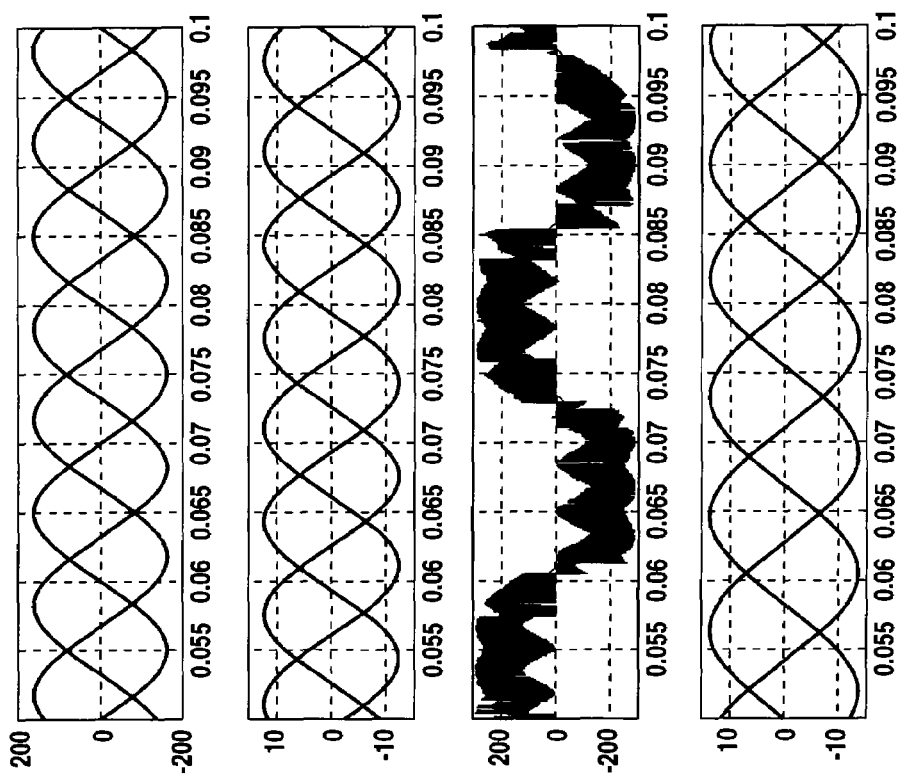
FIG. 9 Explanation diagrams for explaining effects of the present invention.
Figure 9B:
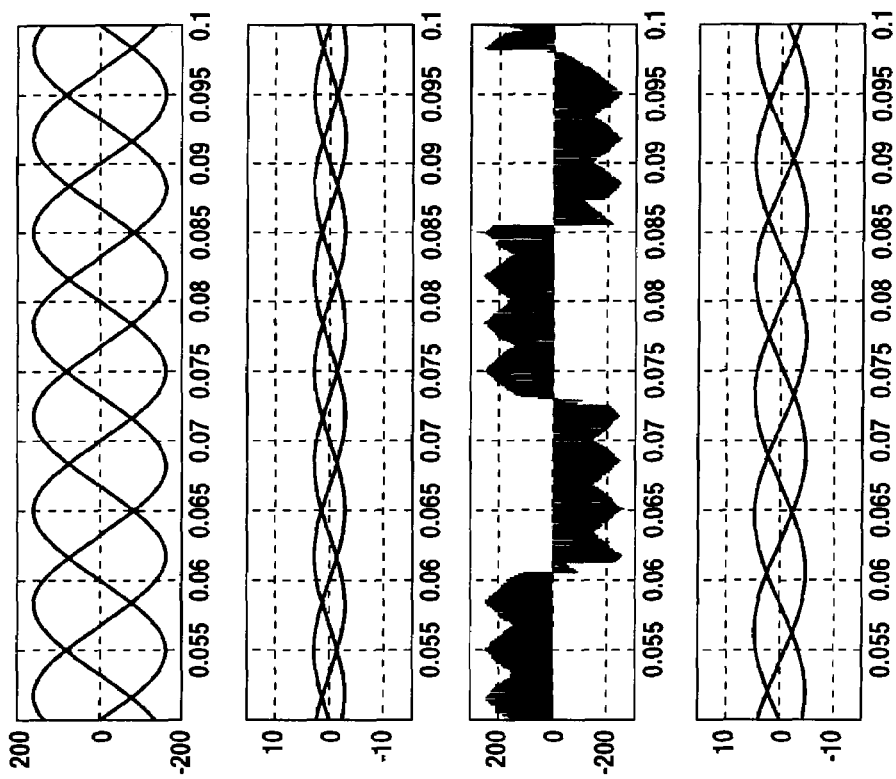
Figure 11:
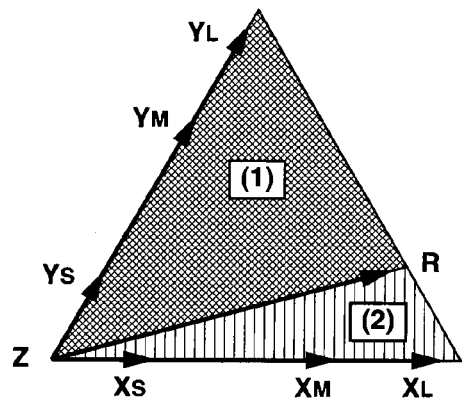
FIG. 11 An explanation diagram for explaining an embodiment 6 of the present invention.
Figure 12:
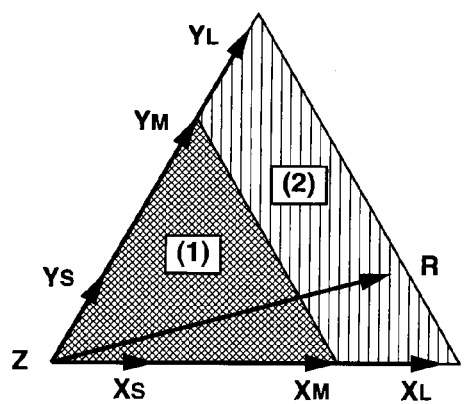
FIG. 12 An explanation diagram for explaining an embodiment 7 of the present invention.
Figure 13:
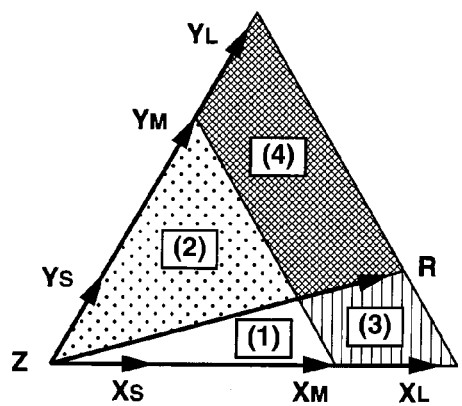
FIG. 13 An explanation diagram for explaining an embodiment 8 of the present invention.
Figure 14:
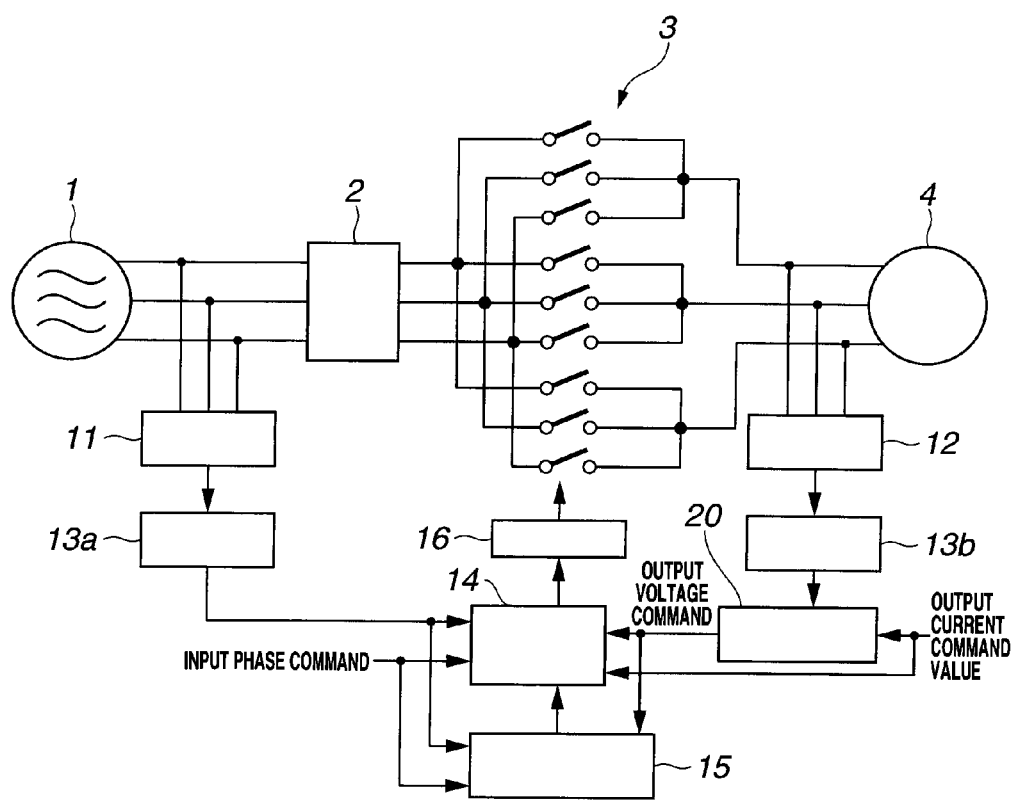
FIG. 14 A configuration diagram showing a system that executes an embodiment 10 of the present invention.

1 ... three-phase AC power source, 2 ... input filtering part, 3 ... semiconductor power conversion part, 4 ... load, 11 ... voltage detection means, 12 ... current detection means, 13a, 13b ... three-phase two-phase conversion means, 14 ... duty operation means, 15 ... selection means, 16 ... gate signal generation part, and 20 ... current feedback control means.

The invention claimed is:

1. A space vector modulation method for a multi-phase AC-AC direct conversion device that PWM-controls bidirectional switches with space vector modulation by a direct AC/AC conversion system, the space vector modulation method for the AC-AC direct conversion device comprising:
defining a vector state in which a line voltage of multi-phase AC output is expanded onto a two-phase static $\alpha\beta$ coordinates;
defining a phase-lagging simple harmonic oscillation vector axis and a phase-leading simple harmonic oscillation vector axis in a sector where an output voltage command value vector Vo* exists as an X axis and a Y axis respectively;
setting eight vectors as base vectors, the eight vectors comprising maximum voltage vectors $X_L$, $Y_L$, middle vectors $X_M$, $Y_M$ and minimum vectors $X_S$, $Y_S$ in each axis, a zero vector Z that is an intermediate voltage phase of a power source, and a rotation vector R that is one rotation vector existing in the sector;
determining a switching selection pattern formed by a combination of four vectors among the eight vectors, which satisfies predetermined conditions for reducing higher harmonics of an input current and/or an output voltage,
deriving a duty coefficient matrix associated with an input and output for the four vectors of the selection pattern on a basis of power source voltage information and output current information;
calculating an inverse matrix of the duty coefficient matrix and determining a duty solution of the four vectors; and
converting input and output waveforms into sine waves simultaneously by the determined duty solution.

2. The space vector modulation method for the AC-AC direct conversion device as claimed in claim 1, wherein:
the predetermined conditions comprise one or more conditions selected from the group consisting of:
the input waveform and the output waveform can be simultaneously converted into the sine waves,
a vector whose voltage difference from a command value when viewed toward a line voltage vector direction is a maximum is not selected,
a switching transition every one phase is possible,
a direct commutation between a maximum voltage phase and a minimum voltage phase of the power source does not occur upon the switching transition, and
the zero vector of the intermediate voltage phase of the power source is used all the time.

3. The space vector modulation method for the AC-AC direct conversion device as claimed in claim 1, wherein:
of all the space vectors of the AC-AC direct conversion device, an output side space vector is listed in tabular form as coefficients of a three-phase two-phase converted $\alpha$ component Vi$\alpha$ of a power source phase voltage detection value and a three-phase two-phase converted $\beta$ component Vi$\beta$ of the power source phase voltage detection value,
an input side space vector is listed in tabular form as coefficients of a three-phase two-phase converted $\alpha$ component Io$\alpha$ of an output load current detection value and a three-phase two-phase converted $\beta$ component Io$\beta$ of the output load current detection value, and
the duty solution of the four vectors is determined by using the table.

4. The space vector modulation method for the AC-AC direct conversion device as claimed in claim 1, wherein:
when determining the duty solution, a check is previously made whether the inverse matrix is present for the selection pattern of the four vectors, and
the selection pattern, the duty solution of which can be obtained, is used as a final duty.

5. The space vector modulation method for the AC-AC direct conversion device as claimed in claim 1, wherein:
when determining the duty solution, an operation is performed with a row whose duty addition value becomes 1 eliminated in the duty coefficient matrix.

6. The space vector modulation method for the AC-AC direct conversion device as claimed in claim 1, wherein:
as the selection pattern, on a basis of magnitude of the output voltage command value,
a selection pattern containing the zero vector is used in a case of a low output voltage area, and
a selection pattern containing no zero vector is used in a case of a high output voltage area.

7. The space vector modulation method for the AC-AC direct conversion device as claimed in claim 1, wherein:
a determinant of the duty coefficient matrix whose inverse matrix is present is previously listed in tabular form for the selection pattern, and
the duty solution of the four vectors is determined by using the table.

8. The space vector modulation method for the AC-AC direct conversion device as claimed in claim 1, wherein:
the selection pattern is fixed according to lag or lead of a rotation vector phase in a sector of an output side space vector.

9. The space vector modulation method for the AC-AC direct conversion device as claimed in claim 1, wherein:
the selection pattern is fixed according to comparison of magnitude of a connection between the middle vectors $X_M$ and $_M$ of the simple harmonic oscillation vectors and the output voltage command value.

10. The space vector modulation method for the AC-AC direct conversion device as claimed in claim 1, wherein
as the selection pattern, a selection pattern having two levels is used.

11. The space vector modulation method for the AC-AC direct conversion device as claimed in claim 1, wherein
at a time when a current detection value is small or at an initial operating start-up, an operation for determining the duty solution of the four vectors is performed on the basis of the power source voltage information and an output current command value.

* * * * *